US008891562B2

(12) United States Patent
Frisken et al.

(10) Patent No.: US 8,891,562 B2
(45) Date of Patent: Nov. 18, 2014

(54) TUNEABLE LASER SOURCE

(75) Inventors: Steven James Frisken, Vaucluse (AU); Daniel Royston Neill, St. Marys (AU)

(73) Assignee: Finisar Corporation, Horsham, PA (US)

( * ) Notice: Subject to any disclaimer, the term of this patent is extended or adjusted under 35 U.S.C. 154(b) by 12 days.

(21) Appl. No.: 13/460,899

(22) Filed: May 1, 2012

(65) Prior Publication Data

US 2012/0281724 A1 Nov. 8, 2012

Related U.S. Application Data

(60) Provisional application No. 61/483,529, filed on May 6, 2011.

(51) Int. Cl.
*H01S 3/10* (2006.01)
*H01S 3/106* (2006.01)
*G02B 27/28* (2006.01)
*H01S 3/08* (2006.01)

(52) U.S. Cl.
CPC ............ *H01S 3/1062* (2013.01); *G02B 27/286* (2013.01); *H01S 3/08054* (2013.01); *H01S 3/08059* (2013.01); *H01S 3/10061* (2013.01); *H01S 3/08013* (2013.01)
USPC .................................. 372/20; 372/27; 372/30

(58) Field of Classification Search
CPC ............ H01S 3/08013; H01S 3/08027; H01S 3/08036; H01S 3/08054; H01S 3/08059; H01S 3/1062; H01S 3/10061; H01S 3/13
USPC ................................................ 372/20, 27, 32
See application file for complete search history.

(56) References Cited

U.S. PATENT DOCUMENTS

| 5,218,610 | A | * | 6/1993 | Dixon ............................ 372/20 |
| 6,327,019 | B1 | | 12/2001 | Patel et al. |
| 6,345,059 | B1 | * | 2/2002 | Flanders ........................ 372/20 |
| 2002/0071624 | A1 | | 6/2002 | Frisken et al. |
| 2002/0131691 | A1 | | 9/2002 | Garrett et al. |
| 2003/0210727 | A1 | | 11/2003 | Frisken et al. |
| 2008/0317072 | A1 | * | 12/2008 | Essaian et al. .................. 372/10 |

FOREIGN PATENT DOCUMENTS

| WO | 03/032071 A1 | 4/2003 |
| WO | 2004/005993 A1 | 1/2004 |

OTHER PUBLICATIONS

"Supplementary Search Report" for EP 05749258.9-2217/1766819, Jan. 21, 2013, European Patent Office, Munich, Germany.

* cited by examiner

*Primary Examiner* — Yuanda Zhang
*Assistant Examiner* — Michael Carter
(74) *Attorney, Agent, or Firm* — Kurt Rauschenbach; Rauschenbach Patent Law Group, LLC

(57) ABSTRACT

Described herein is a laser (1) having a cavity for supporting oscillation of an electromagnetic signal to provide lasing action. A gain element (5) provides a source of stimulated emission for amplifying the oscillating signal. The laser also includes a wavelength selective element (7), which includes a reflecting element and a polarization modifying element. The reflecting element selectively defines a predetermined wavelength and the polarization modifying element selectively modifies the polarization of the signal component at the predetermined wavelength so as to provide high selectivity. The wavelength selective element (7) rotates the signal polarization at the predetermined wavelength into an orthogonal state. A polarization filter (9) filters out the signal components having wavelengths not corresponding to the predetermined wavelength and a polarization rotation element (11) again rotates the polarization of the signal into an orthogonal state.

19 Claims, 12 Drawing Sheets

TUNEABLE LASER SOURCE

CROSS-REFERENCE TO RELATED APPLICATIONS

The present application is a non-provisional of U.S. Provisional Patent Application Ser. No. 61/483,529, filed on May 6, 2011. The entire contents of U.S. Patent Application Ser. No. 61/483,529 is herein incorporated by reference.

FIELD OF THE INVENTION

The present invention relates to lasers and in particular to a wavelength tunable laser for selectively outputting a plurality of different wavelength signals. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Tunable laser sources have a number of important applications including spectroscopy, interferometry, astronomy and optical communications. Previous methods for providing wavelength tuneability in lasers include adjusting the laser cavity length and introducing selective feedback into the cavity. However, these designs suffer from unstable output signals due to effects such as spatial hole burning, mode competition and polarization drift. The output stability of a laser source is often the limiting factor in its use for real world applications.

US Patent Application Publication number US 2003/0210727 entitled "Narrowband Filter Method and Apparatus" is a publication of an earlier application by the inventors of the present application. US 2003/0210727 discloses a narrowband filter device which utilizes a relative resonant wavelength shift in the phase response of a Gires-Tournois resonator. Orthogonal signal components are incident onto a Gires-Tournois resonator at slightly different angles to introduce a relative phase difference between the orthogonal components at a particular wavelength. This phase difference is utilized to manipulate and filter a certain signal component at the particular wavelength. This filtered wavelength is returned at the same polarization state.

While US 2003/0210727 suggests use of such a filter in a tunable laser, it does not significantly overcome the shortfalls mentioned above in relation to output stability. Tunable laser sources providing more stable outputs are desired.

SUMMARY OF THE INVENTION

It is an object of the invention, in its preferred form to provide an improved wavelength tunable laser source.

In accordance with a first aspect of the present invention there is provided a laser including:
 a cavity for supporting oscillation of an electromagnetic signal;
 a tunable filter for filtering a predetermined wavelength range of the electromagnetic signal, the filter including:
  a wavelength selective element for selecting a predetermined wavelength; and
  a first polarization modifying element for selectively modifying the polarization of the signal component at the predetermined wavelength from a first polarization state to a second polarization state; and
 a gain element for amplifying the signal at the predetermined wavelength.

In one embodiment the laser preferably includes a second polarization modifying element for modifying the polarization of the signal back into the first polarization state through one pass of the cavity. In another embodiment, the tunable filter is preferably configured to modify the polarization of the signal back into the first polarization state upon a second pass through the cavity.

The laser preferably includes a polarization filter for filtering out the signal components having wavelengths not corresponding to the predetermined wavelength. The polarization filter includes a birefringent element and a lens. Preferably the polarization filter further includes a first 45° Faraday rotator, a polarizer and a second 45° Faraday rotator disposed in series.

The polarization modifying element preferably rotates the polarization of the signal component at the predetermined wavelength into an orthogonal polarization state. Each orthogonal polarization component is incident onto the wavelength selective element at substantially the same angle.

The tunable filter preferably includes a Gires Tournois etalon and a birefringent element located within the etalon. The plate spacing of the etalon is preferably selectively adjustable to selectively tune the predetermined wavelength. The birefringent element is preferably a walk-off crystal for spatially separating orthogonal polarization components of the signal.

In one embodiment the predetermined wavelength is preferably tuned across a range of wavelengths within a period of the cavity round trip time, thereby providing a laser output that varies in wavelength with time.

The second polarization modifying element preferably includes:
 a walk-off crystal;
 a lens;
 a 45° Faraday rotator; and
 a mirror.

The tunable filter and second polarization modifying element preferably define the respective ends of the cavity. The second polarization modifying element preferably includes a Faraday Rotator mirror.

In one embodiment the tunable filter preferably includes a polarization filter, the polarization filter including:
 a walk-off crystal;
 a lens;
 a 45° Faraday rotator;
 a polarizer; and
 a mirror.

According to a second aspect of the invention there is provided, in a lasing system, a method of providing narrow bandwidth lasing of a predetermined wavelength, the method comprising the steps of:
 (a) modifying the polarization state of the predetermined wavelength from other wavelength ranges; and
 (b) utilizing the modified polarization state to spatially separate the predetermined wavelength from the other wavelength ranges.

Step (a) preferably comprises utilizing a Gires Tournois etalon to impart a predetermined polarization state change on the predetermined wavelength.

The method preferably further includes the step of:

(c) tuning the predetermined wavelength across a range of wavelengths within a period of the cavity round trip time of the lasing system, thereby providing a laser output that varies in wavelength with time.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments will now be described, by way of example only, with reference to the accompanying drawings in which.

DETAILED DESCRIPTION

Figure 1:
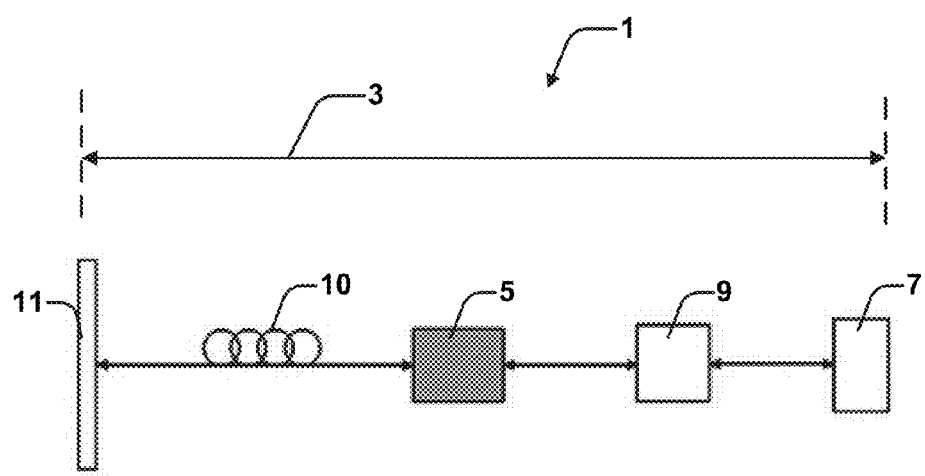
FIG. 1 is a schematic illustration of a laser according to one embodiment, the laser having a long cavity to support multiple oscillating wavelengths.

Embodiments described herein utilize the phase response of a Gires Tournois resonating cavity to provide a selective frequency response. Throughout this description, corresponding features have been given the same reference numerals.

Referring initially to FIG. 1, there is illustrated schematically a laser 1 constructed in accordance with a first primary embodiment. The laser 1 is formed around a cavity structure which is of dimensions 3. The cavity supports oscillation of an electromagnetic signal to provide lasing action. A gain element 5 provides a source of stimulated emission for amplifying the oscillating signal. The laser also includes a wavelength selective element 7, which includes a reflecting element and a polarization modifying element described in more detail below. The reflecting element selectively defines a predetermined wavelength and the polarization modifying element selectively modifies the polarization of the signal component at the predetermined wavelength so as to provide high selectivity. The wavelength selective element 7 rotates the signal polarization at the predetermined wavelength into an orthogonal state. A polarization filter 9 filters out the signal components having wavelengths not corresponding to the predetermined wavelength and a polarization rotation element 11 again rotates the polarization of the signal into an orthogonal state.

The gain element 5 is preferably one or more of a number of conventional gain media including semiconductor materials, dyes or rare earth ions such as Erbium.

Figure 2:
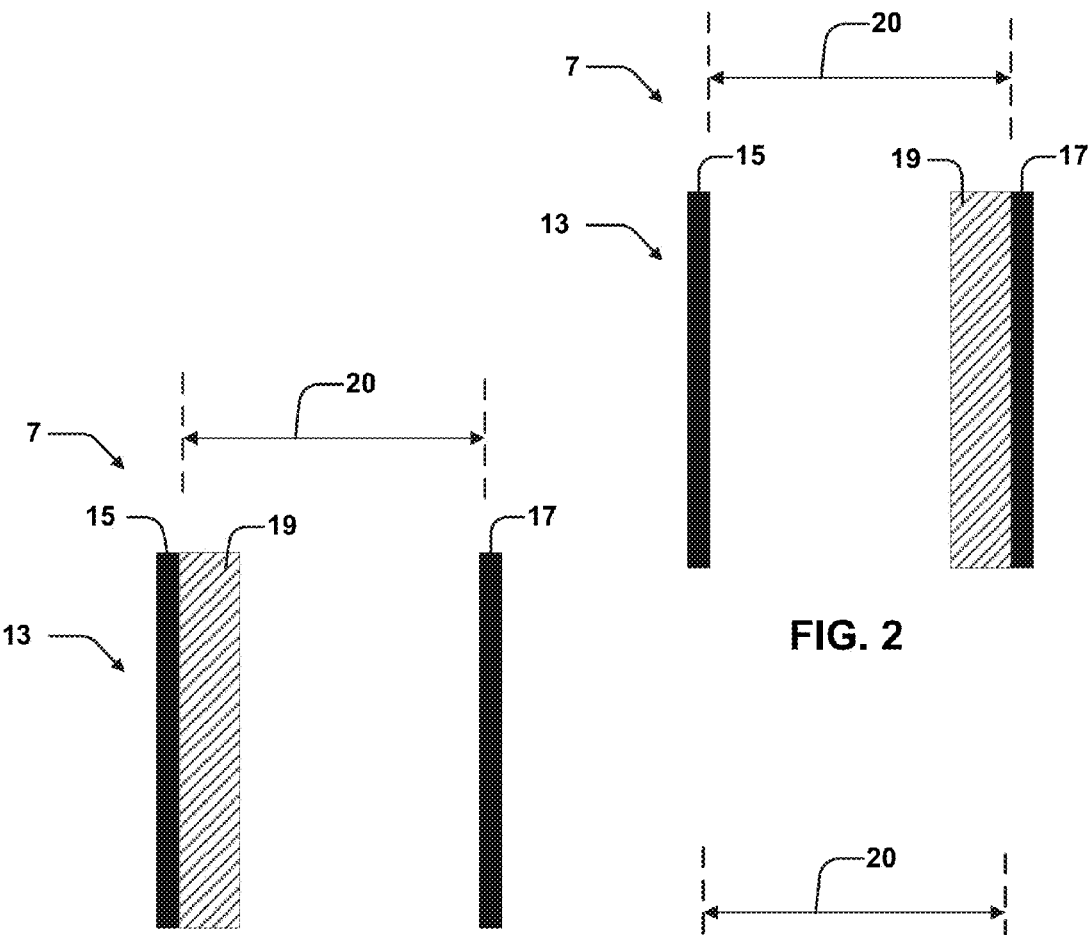
FIG. 2 is a side cross-sectional view of a Gires Tournois etalon according to one embodiment used as the wavelength selective element.
Figure 3:
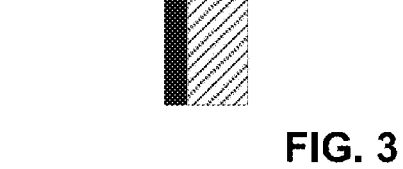
FIG. 3 is a side cross-sectional view of a Gires Tournois etalon according to another embodiment.
Figure 4:
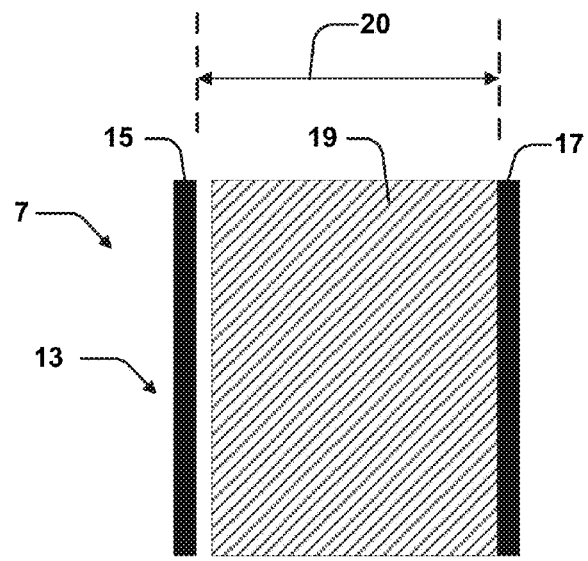
FIG. 4 is a side cross-section view of a Gires Tournois etalon according to a further embodiment.

The wavelength selective element 7 defines a predetermined wavelength by applying wavelength constraints to the electromagnetic signal oscillating in the cavity. The predetermined wavelength is the wavelength that is resonant with each cavity round-trip. Referring to FIGS. 2 to 4, different embodiments of the wavelength selective element 7 are illustrated. To achieve the predetermined wavelength selection the selective element 7 includes a Gires Tournois (GT) etalon 13 having a pair of opposing plates 15 and 17, and a birefringent element 19 located between the plates. A GT etalon is an optical resonator cavity having one plate (outer plate 17) with a reflectivity of about 100% and an opposing plate (inner plate 15) with a lower reflectivity. The GT etalon has the property of providing a wavelength dependent phase response, which is variable by altering the reflectivity of the inner plate 15.

Referring again to FIG. 1, the laser 1 includes a predetermined length of optical fiber 10. This fiber provides additional path length to increase the cavity round-trip propagation time allowing the wavelength selective element 7 to be tuned or swept over a range of wavelengths resonant with each cavity round-trip. This tunability allows multiple wavelength modes to simultaneously exist in the laser cavity. The tunable nature of the laser 1 provides applications for optical coherence tomography, optical frequency domain reflectometry and other laser-based techniques.

In one embodiment, fiber 10 is a polarization maintaining fiber (PMF) to ensure the polarization of the signal is maintained in a predetermined orientation during propagation through the fiber.

Referring to FIG. 2, birefringent element 19 is located adjacent the outer plate 17 of the wavelength selective element 7. However, referring to FIG. 3 it will be appreciated that in other embodiments the birefringent element 19 is able to be located elsewhere within the etalon 13 such as adjacent the inner plate 15. In other embodiments, the birefringent element 19 has varying sizes and, as shown in FIG. 4, may also comprise substantially the entire interior of the etalon 13.

In one particular embodiment, the inner plate 15 of the etalon 13 has a reflectivity of about 90% and the outer plate 17 has a reflectivity of about 99.95%. However, it will be appreciated that plates having other reflectivities are possible and are within the scope of this disclosure. In the illustrated embodiment of FIG. 1, the outer plate 17 defines one end of the cavity and the polarization rotation element 11 defines the other, setting the cavity length 3. In other embodiments, the cavity extends beyond the outer plate 17 and wavelength selective element 7 and may incorporate other optical elements.

Referring collectively to FIGS. 2 to 4, the etalon 13 has a selectively adjustable plate spacing 20 to selectively tune the predetermined wavelength. This adjustment may be provided by a number of methods known in the art including stepper motors and piezoelectric transducer actuators.

In a preferred embodiment, the birefringent element is an angled coating of material deposited on one plate of the etalon 13. However, in other embodiments, the birefringent element 19 is any element that provides birefringent properties, including a waveplate, walk-off crystal, birefringent wedge or a diffraction grating having a periodic diffraction element spacing of less than the predetermined wavelength.

Figure 5:
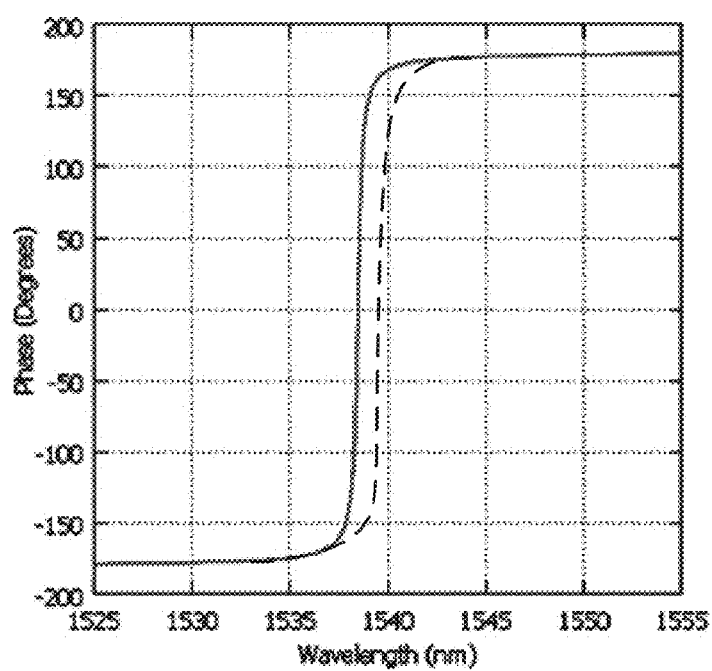
FIG. 5 is a plot of the phase response of a Gires Tournois etalon.

The mechanism by which the wavelength selective element 7 rotates the polarization of the signal component at the predetermined wavelength by 90° will now be described with reference to FIGS. 5 to 7. Referring initially to FIG. 5, the non-uniform wavelength dependent phase response of the etalon 13 is shown by the solid line. It will be noted that a phase transition of about 180° or $\pi$ radians occurs at a resonant wavelength of about 1538 nm. The dashed line represents a wavelength shifted phase response that results from changing the plate spacing 20 of the etalon 13 by a predetermined amount.

By inserting the birefringent element 19 into the etalon 13 of appropriate length, the orthogonal polarization components experience a different optical path length. By introducing this relative path difference, each polarization component has a different phase response. By way of example, one component has a phase response indicative of that of the solid line in FIG. 5, while the orthogonal component has a wavelength shifted phase response indicative of the dashed line.

Figure 6:
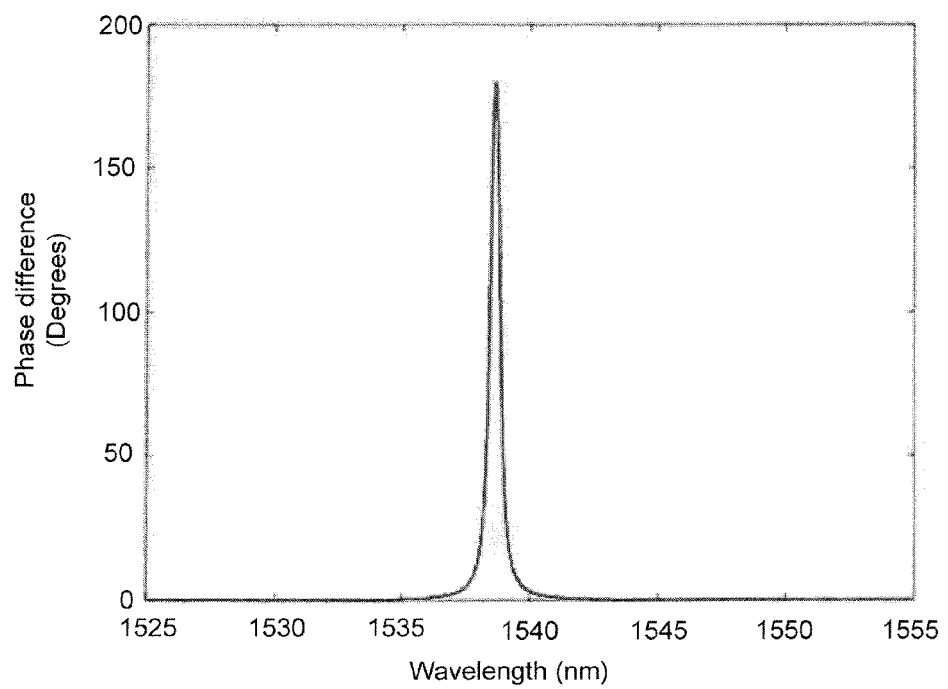
FIG. 6 is a plot of phase difference between orthogonal polarization components of a Gires Tournois etalon with a birefringent cavity.

Referring now to FIG. 6, there is illustrated a relative phase difference between the two orthogonal polarization components created by introducing the birefringent element 19 into the etalon 13 to set up the respective phase responses shown by the solid and dashed lines in FIG. 5. By suitable choice of path length difference, a 180° phase shift is introduced between the orthogonal polarization components for a certain wavelength, which, in the illustrated case is about 1538 nm. The wavelength (or range of wavelengths) at which the 180° phase shift occurs is the predetermined wavelength and occurs intermediate the respective resonant wavelengths at which each polarization component experiences a phase transition.

Figure 7A:
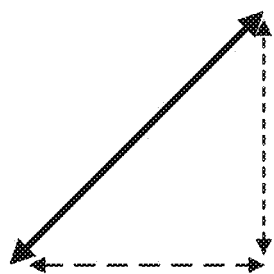
FIG. 7A is a diagram illustrating the orientation of a linearly polarized signal incident on a Gires Tournois etalon at an angle of 45° to the fast axis of the etalon.
Figure 7B:
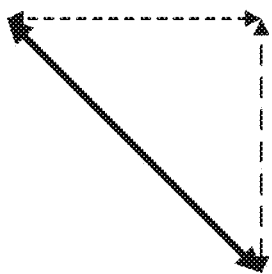
FIG. 7B is a diagram illustrating the orientation of the polarization of a predetermined wavelength signal component output from a Gires Tournois etalon based on the input signal from FIG. 7A.
Figure 7C:
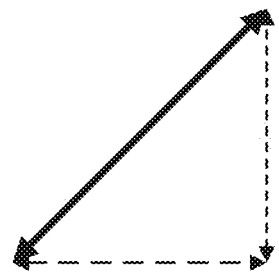
FIG. 7C is a diagram illustrating the orientation of the polarization of a signal component having a wavelength far from the predetermined wavelength being output from a Gires Tournois etalon based on the input signal from FIG. 7A.

Turning now to FIG. 7, the orientation of orthogonal polarization components before and after incidence onto the wavelength selective element 7 is shown. FIG. 7A illustrates a linear polarized signal prior to incidence onto the wavelength selective element 7. The signal has a polarization orientated at +45° to the fast axis of the GT etalon 13, which is arbitrarily chosen to be vertical in this exemplification. The constituent polarization components of this signal are indicated by the dashed lines. FIG. 7B shows the output polarization of the signal component at the predetermined wavelength; that is at 1538 nm using an etalon having the relative phase response illustrated in FIG. 6. FIG. 7C shows the output polarization of the signal components far away from the predetermined wavelength. Comparing FIG. 7A with FIG. 7B it is seen that the net signal polarization has been rotated by 180° and the vertical and horizontal polarization components have opposite orientation indicating a 90° rotation. As such, the signal components incident onto the wavelength selective element 7 at the predetermined wavelength will have their constituent polarization components rotated into orthogonal states. Comparing FIG. 7A and FIG. 7C no change in polarization is experienced by signal components far away from the predetermined wavelength. At wavelengths near the predetermined wavelength, the polarization of the signal varies from −45° to +45° in a manner depending on the specific characteristics of the etalon 13 and the birefringent element 19.

Figure 8:
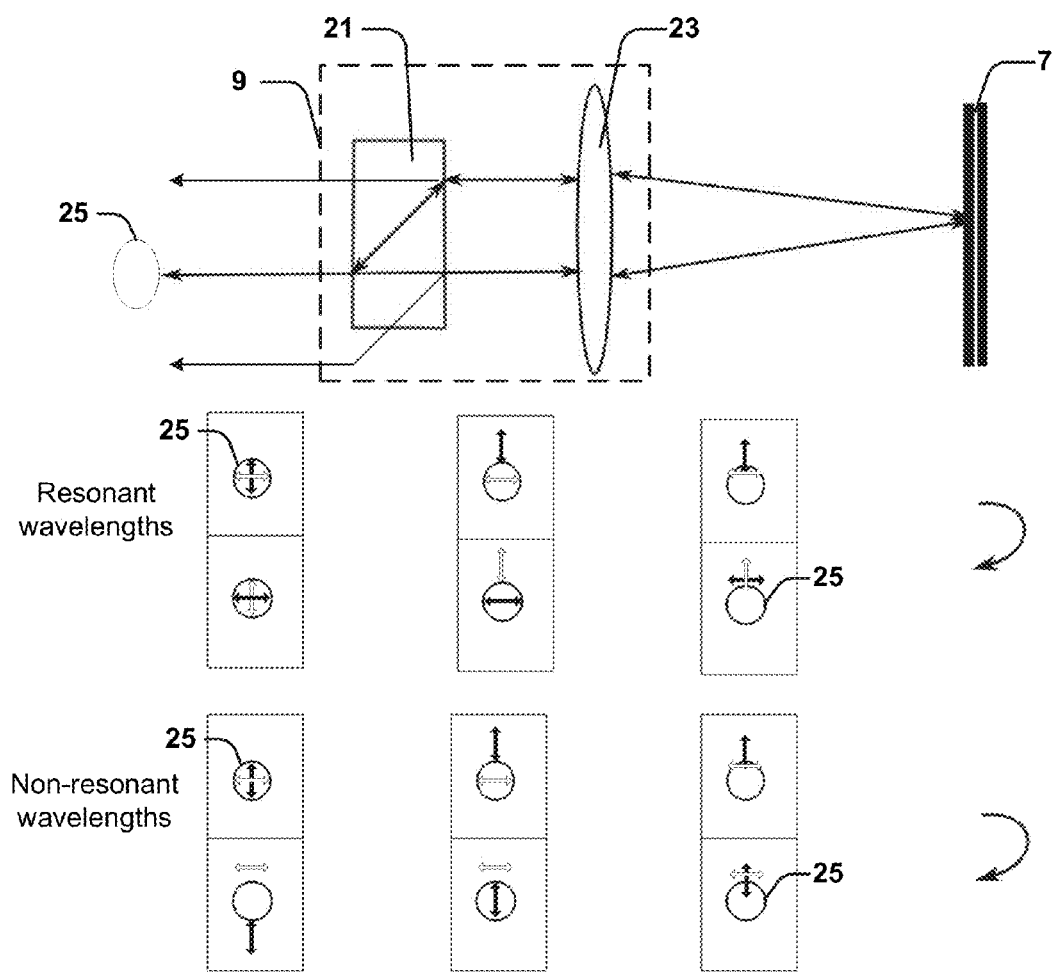
FIG. 8 is a block-ray diagram and polarization state diagram of a signal propagating through a polarization filter and a wavelength selective element according to one embodiment.

To highlight the practical significance of the above-described principles, reference is now made to FIG. 8, wherein the evolution of a signal propagating through the polarization filter 9 and wavelength selective element 7 is shown. This particular embodiment of the polarization filter 9 includes a birefringent element in the form of a walk-off crystal 21 and a lens 23. A walk-off crystal is a material possessing optical birefringent properties such that the propagation path of one polarization component diverges from the original propagation path but maintains the same propagation direction. The propagation path of the orthogonal polarization component remains unchanged.

The filter 9 is used to filter out the signal components not corresponding to the predetermined wavelength, thereby to prevent those components recirculating in the cavity. That is, the polarization filter 9 transmits only signal components having predetermined wavelengths (which have polarizations that have been rotated to the orthogonal state). The remaining signal components are filtered from the cavity.

The axial circles 25 in FIG. 8 and subsequent figures indicate the confinement radius of the signal within the cavity. That is, the radial area of the cavity that the signal is able to stray from the optical axis before it is coupled out of the cavity.

Referring still to FIG. 8, initially the signal has a predetermined polarization state comprised of orthogonal components. Upon traversing the walk-off crystal 21, one component (vertical component in the illustrated example) refracts or walks off-axis vertically due to the birefringent properties of the material. The other component (horizontal component in the illustrated example) remains on-axis through the crystal 21. At the output of the walk-off crystal 21, the two orthogonal polarization components are spatially separated. The polarization separated signal is then incident onto the lens 23 at substantially the same angle, which focuses the two components onto the wavelength selective element 7. At the predetermined wavelength, signal components are rotated 90° in polarization but at the remaining wavelengths no polarization rotation occurs. The signal is coupled back through the lens 23, which collimates the signal onto the walk-off crystal 21.

Figure 9A:
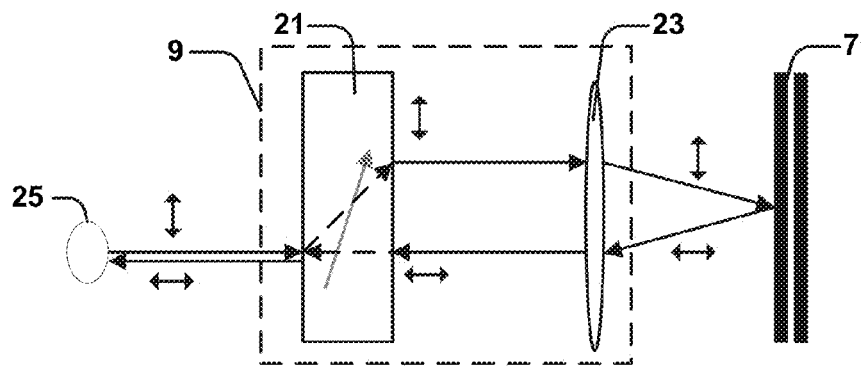
FIG. 9A is a block-ray diagram showing the path of a vertically polarized signal component having a wavelength corresponding to the predetermined wavelength as it propagates through the polarization filter and wavelength selective element combination.

Depending on the polarization state and wavelength, signal components may trace one of four trajectories through the polarization filter 9 and wavelength selective element 7. These trajectories are shown schematically and independently in FIG. 9. FIG. 9A traces the trajectory of a vertically polarized component having a wavelength corresponding to the predetermined wavelength. As shown this component initially diverts or walks upwardly through the walk-off crystal 21. It is then focused by the lens 23 and experiences a 90° change in polarization at wavelength selective element 7. On the reverse trip it is horizontally polarized. The reflected signal is collimated by the lens 23 and is again incident on the walk-off crystal 21. In traversing the walk-off crystal in a horizontally polarized state, the signal experiences no diversion. It therefore propagates directly through the crystal 21 and exits the system at substantially the same axial position as it entered. The signal is therefore efficiently maintained within the cavity.

Figure 9B:
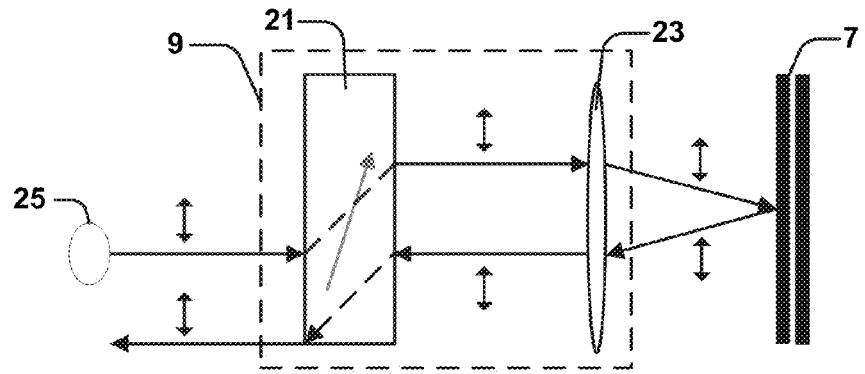
FIG. 9B is a block-ray diagram showing the path of a vertically polarized signal component having a non-resonant wavelength as it propagates through the polarization filter and wavelength selective element combination.

Referring now to FIG. 9B, the trajectory of a vertically polarized component having a non-resonant wavelength is shown. Initially the signal follows the same path as the predetermined wavelength signal of FIG. 9A, being diverted upwardly by walk-off crystal 21. However, at the wavelength selective element 7, the signal experiences no polarization rotation and therefore traverses the return trip in the vertical polarization state. In propagating through walk-off crystal 21 on the return trip the signal again experiences an off-axis walk, this time in the downward direction due to the symmetric properties of the material. This diversion causes the signal to be output at a position outside the cavity confinement radius and therefore is not efficiently coupled back into the cavity. This signal component can effectively be treated as being removed from the cavity.

Figure 9C:
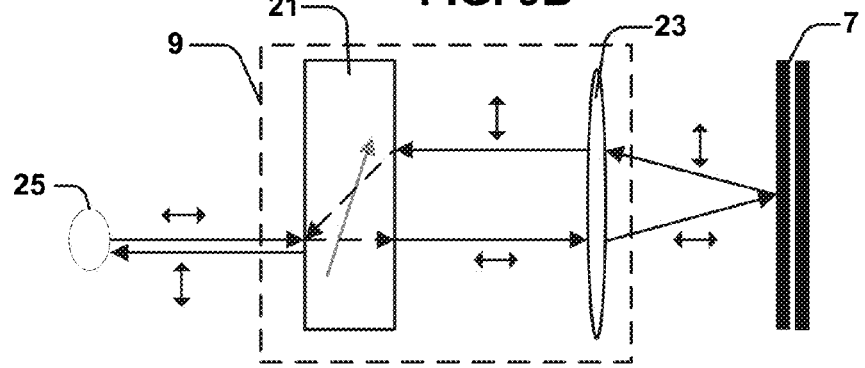
FIG. 9C is a block-ray diagram showing the path of a horizontally polarized signal component having a wavelength corresponding to the predetermined wavelength as it propagates through the polarization filter and wavelength selective element combination.
Figure 9D:
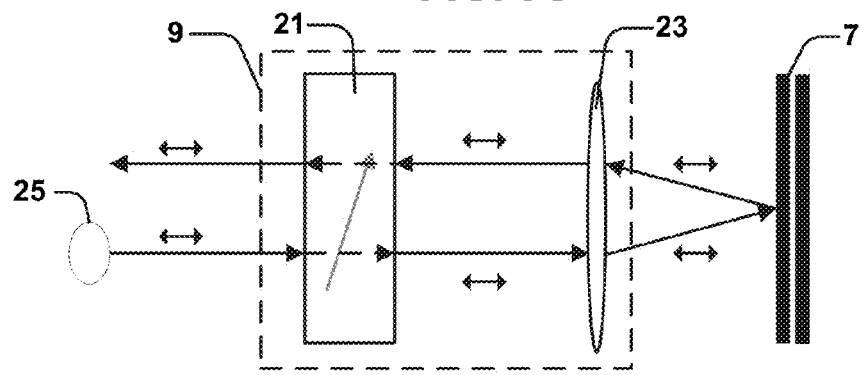
FIG. 9D is a block-ray diagram showing the path of a horizontally polarized signal component having a non-resonant wavelength as it propagates through the polarization filter and wavelength selective element combination.

Referring to FIGS. 9C and 9D, similar propagation occurs for initially horizontally polarized signals. In FIG. 9C a resonant signal component initially experiences no walk-off through the walk-off crystal 21 but is refracted on the return trip coupling it back into the cavity. In FIG. 9D, a non-resonant signal component experiences no walk-off on either pass through the walk-off crystal resulting in this signal component emerging outside the confinement radius and being coupled out of the cavity.

Reviewing FIGS. 9A to 9D together, the polarization filter 9 and wavelength selective element 7 together act to filter out the non-resonant signal components having any initial polarization state and ensure all resonant signal components having any initial polarization state are maintained in the cavity.

It will be appreciated that exemplifying the polarization components as vertical and horizontal polarization components in FIG. 9 is for ease of understanding. It will be appreciated that in various embodiments the laser is configured to appropriately manipulate signals having arbitrary polarization orientations.

In the embodiment illustrated and discussed so far, the polarization filter 9 is located close to the wavelength selective element 7. This is advantageous for reducing the effects of random polarization rotation that can be introduced to the signal by various optical elements present in the cavity (such as the length of optical fiber described earlier). In other embodiments, polarization filter 9 is positioned in the cavity at other locations with suitable polarization rotation compensation in place. In another embodiment use is made of polarization maintaining fiber (PMF) to ensure the polarization of the signal is maintained in a predetermined orientation.

Referring again to FIGS. 8 and 9, this illustrated embodiment does not inherently provide polarization selectivity and, as such, both orthogonal polarization states are transmitted at resonance. This particular bi-modal operation has applications, particularly in providing polarization independent laser output for optical coherence tomography.

Conversely, however, polarization selectivity may be accomplished, in this embodiment, by implementing polarization dependent gain in the gain element 5, either inherently or through other means, such as modulation of the gain.

Figure 10:
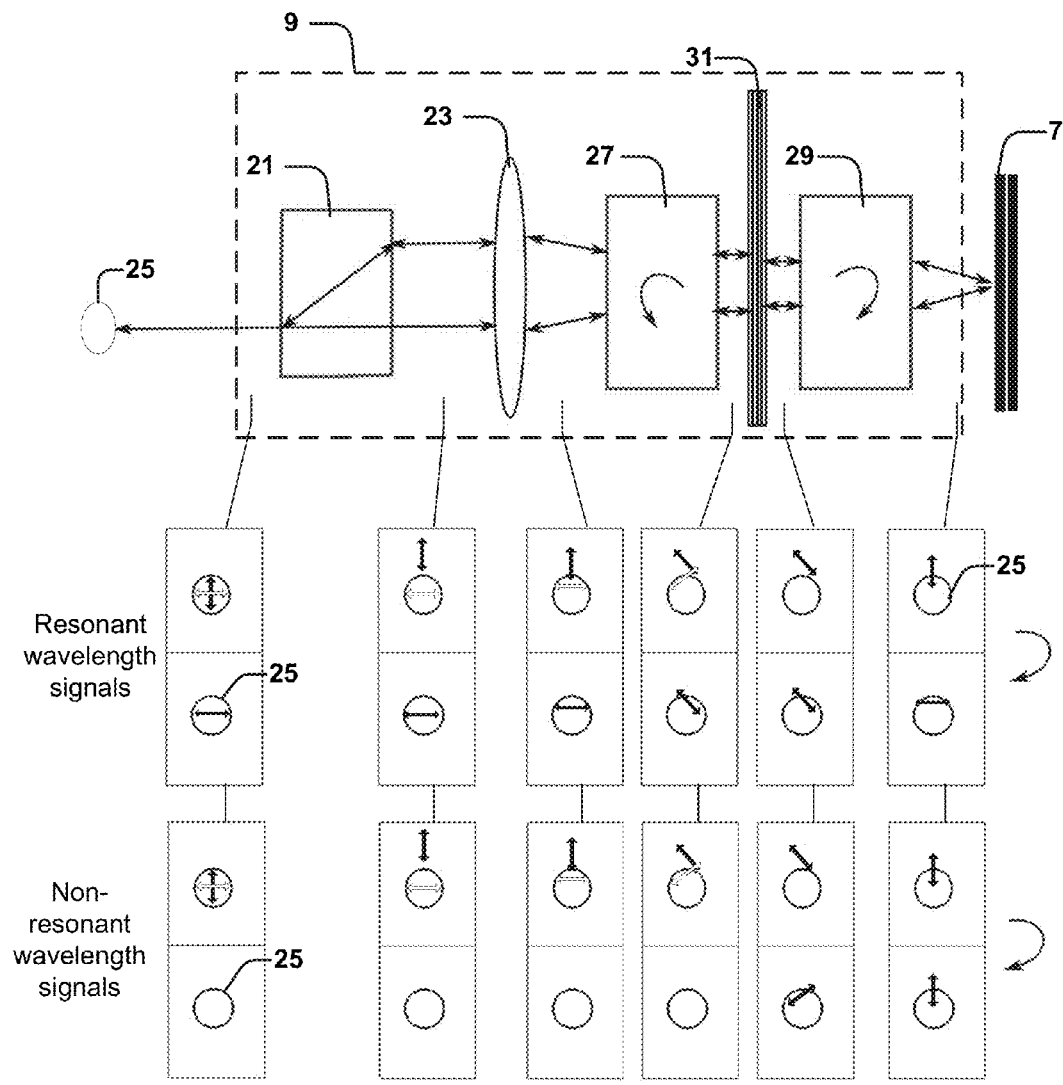
FIG. 10 is a block-ray diagram and polarization state diagram of another embodiment signal propagating through the polarization filter and wavelength selective element combination.

A further embodiment wherein the polarization filter 9 provides polarization selectivity is shown in FIG. 10. The axial positions and orientations of the polarization states through the filter are also shown. In this embodiment, the polarization filter 9 includes a birefringent walk-off crystal 21 and lens 23, as described above, plus two Faraday rotators 27 and 29, and a polarizer 31. Light incident upon the polarization filter 9 is split into orthogonal polarization states by the walk-off crystal 21 in the same manner as described above. The lens 23 focuses the signal in the direction of the first Faraday rotator 27, which rotates the polarization of the signal by 45°. The signal is then passed through the polarizer 31, which filters out one polarization component (in the illustrated case the +45° polarization component is filtered out). Appropriate polarizers are well known in the prior art, and include polarizing beam splitting cubes and sub wavelength diffraction gratings.

The polarized light is then incident on the second Faraday rotator 29 where it again undergoes a 45° polarization rotation, before being incident onto the wavelength selective element 7. As mentioned above, the predetermined wavelength signal component undergoes a 90° polarization rotation. The signal reflected from the wavelength selective element 7 passes again through the second Faraday rotator 29, where the polarization is rotated 45° into the same orientation as the transmission axis of the polarizer 31. Accordingly, the signal is passed unfiltered to the first Faraday rotator 27 where it is rotated a further 45° to the polarization orientation that is orthogonal to the input polarization. The lens 23 focuses the signal onto the walk-off crystal 21, which transmits the signal back into the cavity.

Referring still to FIG. 10, the polarization selectivity of the filter 9 is observed when the orthogonal polarization component is input into the filter. In this case the first Faraday rotator 27 rotates the polarization such that it is blocked by the polarizer 31. Comparing the output resonant wavelength of FIG. 10 to that of FIG. 8, it can be seen that only a single polarization state is returned in the polarization selective embodiment of FIG. 10. In the illustrated embodiment of FIG. 10, the polarizer 31 filters out the horizontal polarization component. However, the desired polarization orientation can be selectively varied by setting the transmission axis of the polarizer 31 to a predetermined orientation.

The use of a walk-off crystal 21 allows for broadband operation of the polarization filter 9 and provides efficient polarization extinction. In FIG. 10, the walk-off crystal 21 is able to compensate at least partially for the wavelength dependence of the Faraday rotation. However, the walk-off crystal introduces some power loss to the oscillating signal.

Figure 11:
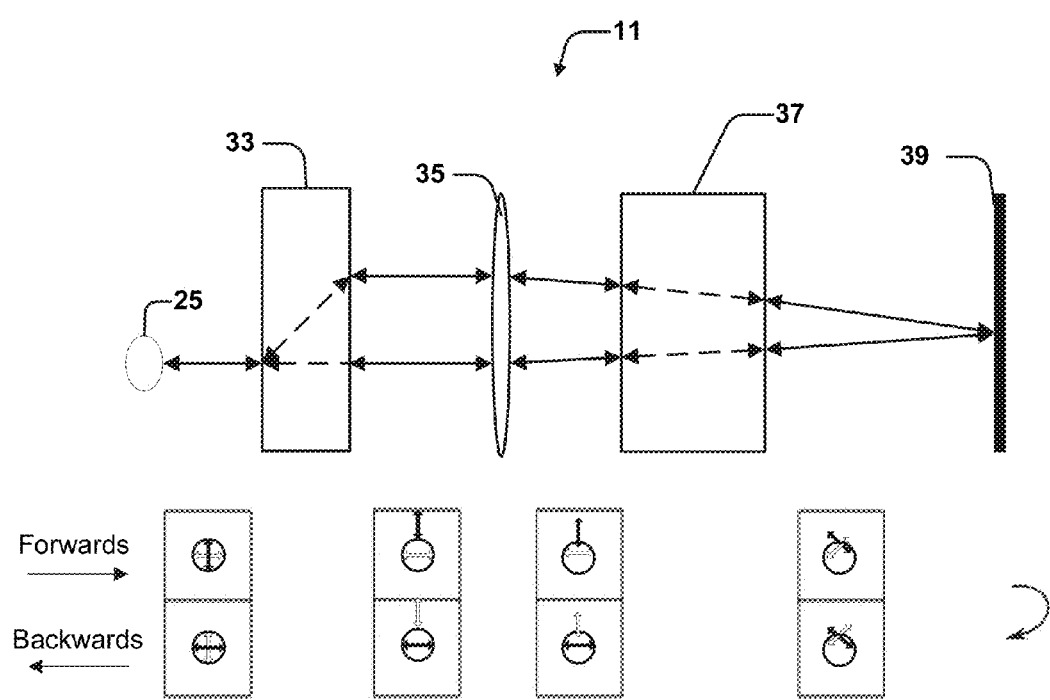
FIG. 11 is block-ray diagram and polarization state diagram showing a signal propagating through the polarization rotation element according to one embodiment.

Referring now to FIG. 11, the optical elements forming the polarization rotation element 11 are illustrated. The polarization rotation element 11 includes a birefringent walk-off crystal 33, a lens 35, a 45° Faraday rotator 37 and a mirror 39. In the preferred embodiment, the mirror 39 defines one end of the laser cavity. The role of element 11 is to rotate each orthogonal component of the incident signal by 90°. While this could ideally be achieved with a 45° Faraday rotator and a mirror, the illustrated embodiment compensates for the imperfect rotation of Faraday rotators with varying wavelength signals. To highlight this, FIG. 11 also shows the sequential changes in polarization orientation of an incident signal including two orthogonal polarization components. For ease of understanding, the polarization components are illustrated respectively as a vertical and horizontal component. As previously mentioned, polarization components are able to be specified in any arbitrary orientation and the vertical and horizontal components are illustrated for simplicity.

Still referring to FIG. 11, the signal is incident onto the walk off crystal 33 which acts to spatially separate the two orthogonal polarization components as described above. In the illustrated case, the vertical component is diverted or walked vertically and the horizontal component remains undiverted from its original path. The separated components propagate through the lens 35 which focuses or converges the spatially separated components towards each other. The converging component signals traverse the Faraday rotator 37 where each signal undergoes a 45° polarization rotation, albeit with some inherent rotation at slightly smaller or larger angles at some wavelengths. The signals are focused onto the mirror 39 where they are reflected without any change in polarization. The reflected signals propagate back through the Faraday rotator 37 and again experience a 45° polarization rotation. At this stage, the initially vertically polarized component is polarized horizontally and the initially horizontally polarized component is polarized vertically. In the reverse direction the lens 35 collimates the signals, prior to propagation through the walk-off crystal 33.

In the ideal case, when traversing the walk-off crystal 33, the now horizontally polarized signal experiences no diversion in optical path while the vertically polarized signal is diverted downward in FIG. 11 to be recombined with the orthogonal signal. However, as mentioned above, the Faraday rotator is wavelength dependent and therefore some wavelengths will be rotated at angles slightly greater or less than 45°. In this case the over or under rotated wavelength components will experience greater or less walk-off from the walk-off crystal 33 and will therefore not be coupled into the cavity confinement radius 25. Accordingly, this configuration compensates for the imperfect rotation by the Faraday rotator at the cost of some extra loss to the signal.

The resulting recombined signal includes both orthogonal polarization components, with each having a polarization opposite to its original orientation. In the case where the incident signal only has one linearly polarized component, this single component will be output from the polarization rotation element 11 with the opposite polarization.

In another embodiment, the polarization rotation element 11 includes a Faraday Rotator mirror, which induces a 90° phase change between the orthogonal polarization components thereby alternating the orientations of the respective components.

Referring again to FIG. 1, combining the elements described above, the laser 1 acts to support an optical signal of a predetermined wavelength defined by the wavelength selective element 7 and transmits a particular polarization state through the cavity where it undergoes a complete polarization rotation per cycle. This resonant polarization state at the particular predetermined wavelength oscillates continuously in the laser cavity and is amplified each pass by the gain element 5. Laser output is provided by coupling the oscillating signal out of the cavity in a manner known in the art. For example, the mirror 39 may permit a small transmittance which is coupled to an output system or an optical coupler may be inserted into the system to tap-off some of the signal as laser output.

Referring still to FIG. 1, the length of optical fiber 10 establishes a long cavity having a relatively long cavity round trip time. The cavity round trip time is the time taken for optical energy to propagate through the entire length of the cavity and is directly related to the length and effective refractive index of the cavity. The long round trip time allows the predetermined wavelength to be swept or tuned across a range of wavelengths throughout a period of the cavity round trip. By periodically sweeping across this range of wavelengths in a time period synchronous with the cavity round trip time, or multiple times per cavity round trip time, amplification of the entire range of wavelengths occurs. This provides a narrow linewidth output that varies in wavelength with time.

Such swept wavelength systems have important applications in the fields of optical coherence tomography and optical sensing. An advantage of the long cavity embodiment of the present disclosure over other swept wavelength sources is that the polarization state of the oscillating optical signal is circulated and controlled throughout the cavity. This provides a more stable laser oscillation as the effects of polarization drift and mode competition are significantly reduced. The polarization control also allows the laser to be implemented in a linear cavity arrangement, rather than the fiber ring configuration of other known designs.

Figure 12:
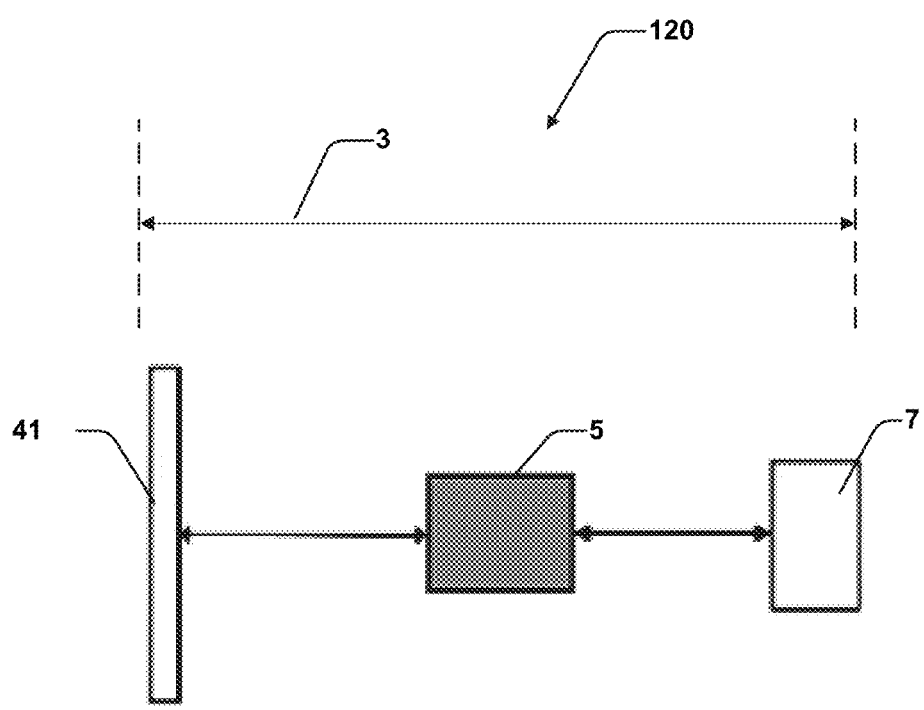
FIG. 12 is a schematic illustration of a laser according to a further embodiment having a reduced cavity length.

Turning now to FIG. 12, there is illustrated a laser 120 constructed in accordance with another embodiment. Laser 120 has several important differences from laser 1 illustrated in FIG. 1. The first is the omission of fiber length 10, thereby defining a short cavity length laser. Also, the polarization filter 9 and the polarization rotation element 11 of FIG. 1 are implemented as a single unit, collectively labelled 41. This combination is possible as the short cavity length ensures that inherent random polarization rotation within the cavity is relatively insignificant.

Figure 13:
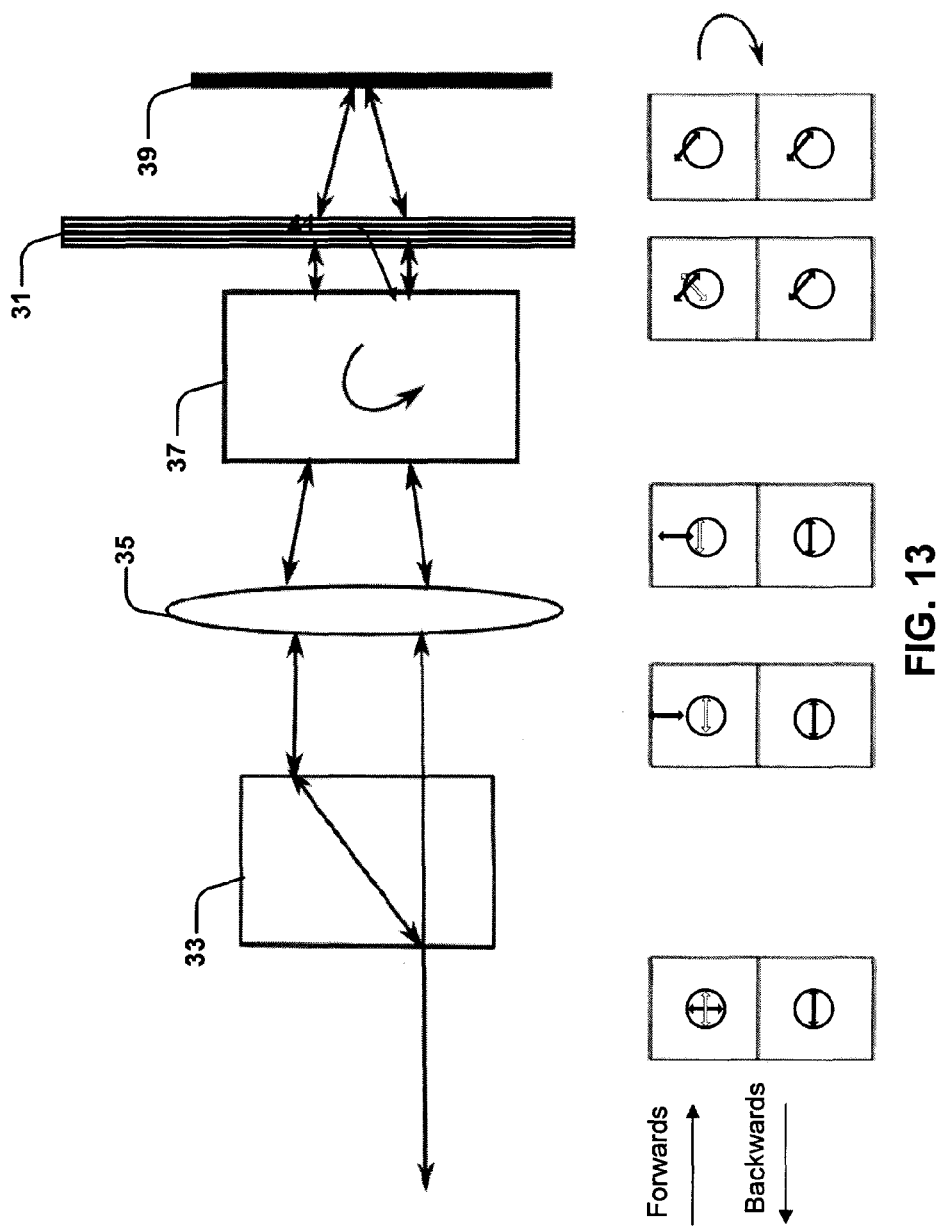
FIG. 13 is a block-ray diagram and polarization state diagram showing a signal propagating through the polarization rotation element according to a further embodiment where the polarization filter is inserted between the Faraday rotator and the mirror.

Referring to FIG. 13, the optical elements forming the polarization rotator/mirror 41 are shown. Element 41 includes a walk-off crystal 33, lens 35, a 45° Faraday rotator 37, polarizer 31, and mirror 39, which are all given the same reference numerals as before due to their identical functionality as described previously. To illustrate the function of element 41, the evolution of the axial positions and orientations of the polarization states are also shown in FIG. 13. The two axially aligned orthogonal polarization states are incident onto the walk-off crystal 33 where the vertical component is diverted upward. The spatially separated components are then focused and converged by the lens 35, which has a focal plane at the mirror 39. The separated but converging components are next rotated by 45° by the faraday rotator 37 and incident onto the polarizer 31. The polarizer has a transmission axis of +45° and therefore filters out the initially horizontal component that was rotated by the Faraday rotator and transmits the initially vertical component.

The remaining component is then reflected off the mirror 39 without any polarization modification and passed again through the polarizer 31, which fully transmits the component. Upon a second pass through the Faraday rotator 37, the remaining signal component rotated a further 45° into the horizontal orientation where it is transmitted through the lens 35 and collimated onto the walk-off crystal 33. As the component is now horizontally polarized, the walk-off crystal has no net effect on the signal and it is transmitted through the crystal in its original axially aligned direction.

The short cavity length of the embodiment of FIGS. 12 and 13 provides a short cavity round trip time. One advantage of this is that optical signals are able to perform more passes of the gain medium 5 in a given period of time thereby being amplified more quickly. This rapid amplification allows the selective element to more quickly tune a predetermined wavelength without significantly depleting the available gain in the gain medium and reducing the coherence.

This short cavity embodiment of the laser has applications such as optical coherence tomography and as a stable output tunable laser source.

Figure 14:
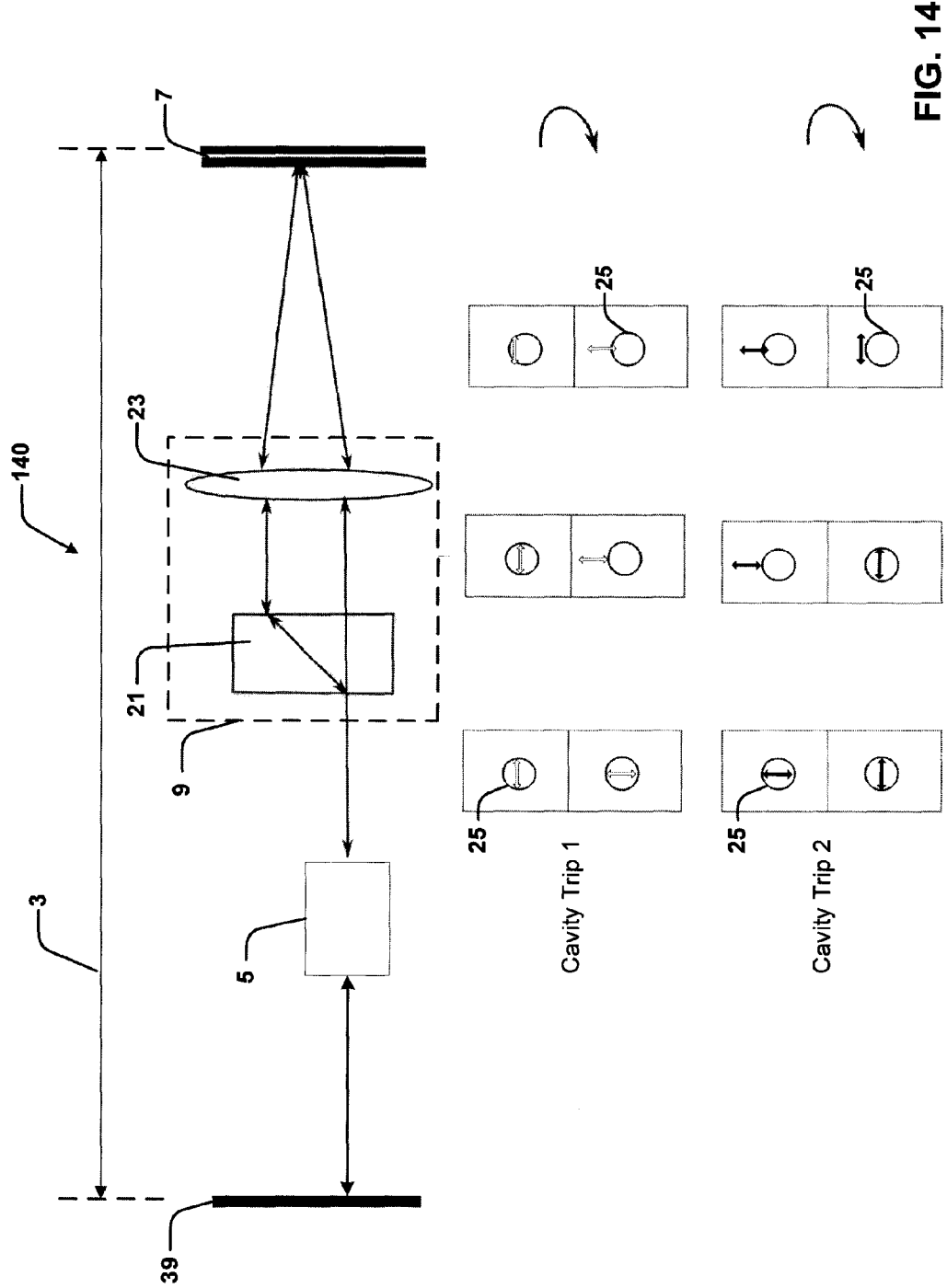
FIG. 14 is a block-ray diagram and polarization state diagram showing a signal propagating through double-pass cavity embodiment.

Referring now to FIG. 14 there is provided a further embodiment tunable laser 140. This embodiment includes the polarization filter 9 and wavelength selective element 7 of FIG. 8 but includes only a mirror 39, rather than a polarization rotating element 11 at the other end of the cavity. Accordingly, the signal polarization is not returned to its original orientation throughout a single pass of the cavity. Rather, the signal requires two passes of the cavity to be returned to its original polarization state, as illustrated by the polarization state diagram in the lower portion of FIG. 14.

Using this double cavity operation, it is possible to sample the output once per cavity round trip time to therefore provide laser output with alternating orthogonal polarizations. Such a laser output regime is advantageous for providing polarization independent measurements in optical coherence tomography.

CONCLUSIONS

It will be appreciated that the disclosure above provides an improved wavelength tunable laser source.

It is known that many other known frequency swept lasers implement a ring fiber configuration. In these designs, tunable filtering may be provided by a moveable air gap between adjacent lengths of optical fiber. Such an arrangement imposes strict limitations on the tuneability of the laser as the precise coupling requirements of optical fibers must be maintained in all filter positions. The linear design of the present laser avoids these otherwise necessary limitations by implementing a GT etalon as a tunable filter, which uses optical mirrors that tolerate more spatial movement and are less susceptible to alignment issues. These relaxed constraints allow the GT etalon, and hence the laser output to be tuned faster than other traditional designs.

Embodiments of the present disclosure described so far utilize the polarization selective wavelength selective element 7 to provide bi-directional propagation of orthogonally polarized optical signals in a linear laser cavity. That is, signals propagating in one direction along the cavity are orthogonal in polarization to signals propagating in the opposite direction. This is advantageous in reducing mode competition and spatial hole burning in the gain medium, which consequently provides for a more stable laser output in terms of both frequency and power.

A further application is found in optical coherence tomography where such polarization independent laser output is advantageous. Similar advantages are realized by implementing a double cavity propagation wherein the polarization state of the propagating signal alternates with each pass of the cavity. By sampling the laser output once per cavity round trip time, laser output with alternating polarization states is achieved.

While, in the presently described embodiments, the polarization selective wavelength selective element 7 is utilized in a laser, it will be appreciated that other uses may be employed for such an element based on the teachings of the present disclosure.

Interpretation

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Therefore, reference to a 90° rotation is interpreted to mean a rotation into an orthogonal state and vice versa.

It should be appreciated that in the above description of exemplary embodiments, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claimed tunable laser requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments are able to be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A laser including:
   a cavity configured to support oscillation of an electromagnetic signal;
   a tunable filter to reflectively filter a predetermined wavelength range of the electromagnetic signal, the filter including:
      a wavelength selective element including an etalon operating in a reflective mode to reflect all wavelengths, the etalon having a pair of opposing plates to select a predetermined wavelength range, a first plate of the etalon being partially transmissive and a second plate of the etalon being highly optically reflective, wherein the plate spacing of the etalon is selectively adjustable to selectively tune the predetermined wavelength; and
      a first polarization modifying element to selectively modify the polarization of the signal component at the predetermined wavelength range from a first polarization state to a second polarization state; and
   a gain element for amplifying the signal at the predetermined wavelength range.

2. A laser according to claim 1 including a second polarization modifying element to modify the polarization of the signal back into the first polarization state through one pass of the cavity.

3. A laser according to claim 2 wherein the second polarization modifying element includes:
   a walk-off crystal;
   a lens;
   a 45° Faraday rotator; and
   a mirror.

4. A laser according to claim 3 wherein the tunable filter and second polarization modifying element define the respective ends of the cavity.

5. A laser according to claim 2 wherein the second polarization modifying element includes a Faraday Rotator mirror.

6. A laser according to claim 1 wherein the tunable filter is configured to modify the polarization of the signal back into the first polarization state upon a second pass through the cavity.

7. A laser according to claim 1 including a polarization filter to filter out the signal components having wavelengths not corresponding to the predetermined wavelength.

8. A laser according to claim 7 wherein the polarization filter includes a birefringent element and a lens.

9. A laser according to claim 8 wherein the polarization filter further includes a first 45° Faraday rotator, a polarizer and a second 45° Faraday rotator disposed in series.

10. A laser according to claim 1 wherein the polarization modifying element rotates the polarization of the signal component at the predetermined wavelength into an orthogonal polarization state.

11. A laser according to claim 10 wherein each orthogonal polarization component is incident onto the wavelength selective element at substantially the same angle.

12. A laser according to claim 1 wherein the tunable filter includes a Gires Tournois etalon and a birefringent element located within the etalon.

13. A laser according to claim 1 wherein the birefringent element is a walk-off crystal to spatially separating orthogonal polarization components of the signal.

14. A laser according to claim 1 wherein the predetermined wavelength is tuned across a range of wavelengths within a period of the cavity round trip time, thereby providing a laser output that varies in wavelength with time.

15. A laser according to claim 1 wherein the tunable filter includes a polarization filter, the polarization filter including:
   a walk-off crystal;
   a lens;
   a 45° Faraday rotator;
   a polarizer; and
   a mirror.

16. In a lasing system, a method of providing narrow bandwidth lasing of a predetermined wavelength, the method comprising the steps of:
   (a) modifying the polarization state of the predetermined wavelength from other wavelength ranges using an etalon operating in a reflective mode to reflect all wavelengths, the etalon having a pair of opposing plates to select a predetermined wavelength range, a first plate of the etalon being partially transmissive and a second plate of the etalon being highly optically reflective, wherein the plate spacing of the etalon is selectively adjustable to selectively tune the predetermined wavelength; and
   (b) utilizing the modified polarization state to spatially separate the predetermined wavelength from the other wavelength ranges.

17. A method according to claim 16 wherein step (a) comprises utilizing a Gires Tournois etalon to impart a predetermined polarization state change on the predetermined wavelength.

18. A method according to claim 16 further including the step of:
   (c) tuning the predetermined wavelength across a range of wavelengths within a period of the cavity round trip time of the lasing system, thereby providing a laser output that varies in wavelength with time.

19. A method according to claim 16 wherein, in step (b), the predetermined wavelength is spatially separated from the other wavelength ranges such that the predetermined wavelength is confined within the lasing system and the other wavelengths are at least partially coupled out of the lasing system.

* * * * *